(12) United States Patent
Freund et al.

(10) Patent No.: US 9,976,499 B2
(45) Date of Patent: May 22, 2018

(54) ENGINE SYSTEM AND METHOD

(71) Applicant: General Electric Company, Schenectady, NY (US)

(72) Inventors: Sebastian Freund, Unterfoehring (DE); Jassin Fritz, München (DE); Robert Mischler, Lawrence Park, PA (US); David Zielinski, Lawrence Park, PA (US); Luke Michael Henry, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 14/624,804

(22) Filed: Feb. 18, 2015

(65) Prior Publication Data

US 2015/0159589 A1 Jun. 11, 2015

Related U.S. Application Data

(63) Continuation-in-part of application No. 12/888,928, filed on Sep. 23, 2010, now abandoned.

(51) Int. Cl.
*B60T 7/12* (2006.01)
*F02D 41/00* (2006.01)
(Continued)

(52) U.S. Cl.
CPC ..... *F02D 41/0065* (2013.01); *F02D 41/0082* (2013.01); *F02D 41/1497* (2013.01); *F02M 26/43* (2016.02); *F01N 2590/08* (2013.01); *F02B 37/00* (2013.01); *F02D 13/0203* (2013.01); *F02D 13/0219* (2013.01); *F02D 41/2451* (2013.01); *F02D 41/401* (2013.01);
(Continued)

(58) Field of Classification Search
CPC ............ F02B 19/1052; F02D 41/0002; F02D 41/0052; B60W 2710/0627
USPC .... 701/103, 104, 108; 123/27 R, 58.8, 70 R, 123/276, 305, 316, 560, 568.8, 568.13; 60/605.2
See application file for complete search history.

(56) References Cited

U.S. PATENT DOCUMENTS 4,131,095 A 12/1978 Ouchi
4,201,180 A 5/1980 Iizuka
(Continued)

FOREIGN PATENT DOCUMENTS

CN 101624948 A 1/2010
DE 3404769 A1 8/1985
(Continued)

OTHER PUBLICATIONS

Benajes et al., "Influence of Injection Conditions and Exhaust Gas Recirculation in a High-Speed Direct-Injection Diesel Engine Operating With a Late Split Injection", Journal of Automobile Engineering, vol. 222, 2008.
(Continued)

*Primary Examiner* — John Kwon
(74) *Attorney, Agent, or Firm* — GE Global Patent Operation; John A. Kramer

(57) ABSTRACT

An engine system includes a plurality of cylinders including one or more donating cylinders and one or more non-donating cylinders. A control module controls an operation of the one or more donating cylinders relative to, or based on, the operation of the one or more non-donating cylinders.

20 Claims, 6 Drawing Sheets

(51) Int. Cl.
*F02D 41/14* (2006.01)
*F02M 26/43* (2016.01)
*F02D 41/24* (2006.01)
*F02D 41/40* (2006.01)
*F02B 37/00* (2006.01)
*F02D 13/02* (2006.01)
*F02M 26/46* (2016.01)
*F02M 26/05* (2016.01)
*F02M 26/27* (2016.01)
*F02M 26/47* (2016.01)

(52) U.S. Cl.
CPC ....... *F02D 2041/001* (2013.01); *F02M 26/05* (2016.02); *F02M 26/27* (2016.02); *F02M 26/46* (2016.02); *F02M 26/47* (2016.02); *Y02T 10/47* (2013.01)

(56) References Cited

U.S. PATENT DOCUMENTS

| | | | |
|---|---|---|---|
| 4,231,338 | A | 11/1980 | Sugasawa |
| 4,364,345 | A | 12/1982 | Tsutsumi |
| 4,462,351 | A | 7/1984 | Fujii et al. |
| 4,506,633 | A | 3/1985 | Britsch |
| 5,121,734 | A | 6/1992 | Grieshaber |
| 5,203,310 | A | 4/1993 | Gatellier |
| 5,562,085 | A | 10/1996 | Kosuda et al. |
| 5,740,785 | A | 4/1998 | Dickey et al. |
| 5,894,726 | A | 4/1999 | Monnier |
| 6,343,586 | B1 | 2/2002 | Muto |
| 6,446,430 | B1 | 9/2002 | Roth et al. |
| 6,789,531 | B1 | 9/2004 | Remmels |
| 6,871,642 | B1 | 3/2005 | Osterwald |
| 6,877,492 | B1 | 4/2005 | Osterwald |
| 6,957,642 | B2 | 10/2005 | Miura |
| 6,964,158 | B2 | 11/2005 | Abdul-Khalek |
| 6,989,045 | B2 | 1/2006 | Bailey et al. |
| 7,062,904 | B1 | 6/2006 | Hu et al. |
| 7,100,431 | B2 | 9/2006 | Amman et al. |
| 7,263,428 | B2 | 8/2007 | Kobayashi |
| 7,273,045 | B2 | 9/2007 | Kurtz et al. |
| 7,347,182 | B2 | 3/2008 | Vogel |
| 7,637,098 | B2 | 12/2009 | Persson |
| 7,681,560 | B2 | 3/2010 | Yamaoka et al. |
| 2009/0308070 | A1 | 12/2009 | Alger, II |
| 2010/0010728 | A1 | 1/2010 | Stein et al. |
| 2013/0030672 | A1* | 1/2013 | Klingbeil ............ F02D 41/0085 701/109 |
| 2013/0186376 | A1* | 7/2013 | Peters ................. F02D 41/0065 123/568.2 |

FOREIGN PATENT DOCUMENTS

| | | |
|---|---|---|
| DE | 102006049392 A1 | 5/2007 |
| EP | 1905999 A2 | 4/2008 |
| GB | 2156045 A | 10/1985 |
| GB | 2442550 A1 | 4/2008 |
| JP | 5896159 A | 6/1983 |
| JP | 1182181 A | 3/1999 |
| WO | 2004007925 A1 | 1/2004 |
| WO | 2007084691 A2 | 7/2007 |
| WO | 2009100451 A2 | 8/2009 |

OTHER PUBLICATIONS

Prasad et al., "Reduction of NOx in the Exhaust Gas of DI-Diesel Engine Fueled With Mahua Methyl Ester Along With Exhaust Gas Recirculation", Journal of Renewable Sustainable Energy, vol. 1, 2009.

Search report and written opinion from corresponding PCT Application No. PCT/US2010/057309, dated Mar. 23, 2013.

PCT Search Report and Written Opinion issued in connection with related PCT Application No. PCT/US2010/059004 dated Mar. 9, 2011.

International Preliminary Report on Patentability issued in connection with related PCT Application No. PCT/US2010/059004 dated Jan. 17, 2013.

US Non-Final Office Action issued in connection with related U.S. Appl. No. 12/827,251 dated Mar. 29, 2013.

Australian Notice of Acceptance issued in connection with related AU Application No. 2010356307 dated Apr. 22, 2014.

Unofficial English Translation of Chinese Office Action issued in connection with related CN Application No. 201080067801.X dated May 27, 2014.

Unofficial English Translation of Chinese Office Action issued in connection with related CN Application No. 201080067801.X dated Feb. 15, 2015.

European Office Action issued in connection with related EP Application No. 10788475.1 dated May 30, 2017.

* cited by examiner

ENGINE SYSTEM AND METHOD

CROSS-REFERENCE TO RELATED APPLICATIONS

This application is a continuation-in-part of U.S. patent application Ser. No. 12/888,928, which was filed on 23 Sep. 2010, and the entire disclosure of which is incorporated herein by reference.

BACKGROUND

Technical Field

The subject matter described herein relates to internal combustion engines, and to exhaust gas recirculation systems and methods.

Discussion of Art

Engines include a plurality of cylinders having combustion chambers with pistons disposed in the combustion chambers. Intake air is directed into the combustion chambers and is compressed in the combustion chambers. The ignited fuel generates pressure in the combustion chamber that moves the piston. The ignition of the fuel creates a gaseous exhaust in the combustion chamber. Some engines attempt to change the composition of the intake air by recirculating parts of the exhaust gas back into the intake. Exhaust gas recirculation may be referred to as "EGR".

In a certain configuration, an EGR engine recirculates the gaseous exhaust from one or more dedicated cylinders back into air the intake stream. A cylinder that provides the gaseous exhaust may be referred to as a spender, donor or donating cylinder.

It may sometimes be desirable to have an engine system that has components, features or functions that differ from those EGR engines that are currently available. Likewise, it may be desirable to have engine systems that having modes of operation that differ from those operational modes available on current EGR engines.

BRIEF DESCRIPTION

In embodiments, an engine system includes a plurality of cylinders including one or more donating cylinders and one or more non-donating cylinders. A control module controls an operation of the one or more donating cylinders relative to, or based on, the operation of the one or more non-donating cylinders.

In one embodiment, an engine system includes a non-donating cylinder, a donating cylinder, and a control module. The non-donating cylinder has a first piston joined to a shaft and moveable within a first combustion chamber of the non-donating cylinder according to a multi-stroke cycle. The donating cylinder has a second piston joined to the shaft and moveable within a second combustion chamber of the donating cylinder according to the multi-stroke cycle. The non-donating cylinder and the donating cylinder receive air and fuel according to operational parameters of the non-donating cylinder and the donating cylinder to ignite the fuel and move the first and second pistons within the first and second combustion chambers, respectively. The operational parameters define at least one of valve timing of the multi-stroke cycle, injection timing of the multi-stroke cycle or an amount of the fuel received by the non-donating cylinder and the donating cylinder during the multi-stroke cycle. The control module is communicatively coupled with the non-donating cylinder and the donating cylinder. The control module changes at least one of the operational parameters of the donating cylinder relative to the operational parameters of the non-donating cylinder based on one or more of an engine performance index or an effluent characterization index of gaseous exhaust generated by one or more of the donating and non-donating cylinders.

In one embodiment, a control method for an engine system is provided. The method includes operating a donating cylinder and a non-donating cylinder of an engine.

DETAILED DESCRIPTION

An engine system is provided as well as a corresponding method of operating the engine system. In one embodiment, the engine system includes a plurality of cylinders including one or more donating cylinders and one or more non-donating cylinders. A control module controls an operation of the one or more donating cylinders relative to, or based on, the operation of the one or more non-donating cylinders.

For clarity of illustration, one or more embodiments may be described in connection with propulsion-generating rail vehicle systems having diesel electric locomotives with trailing passenger or cargo cars, however the embodiments described herein are not limited to such locomotives or to diesel engines. For example, the engine system may be mobile or stationary, and/or may not be a diesel engine system. If mobile, the engine system may be a component of a vehicle. Suitable vehicles include those that travel on one or more rails, mining vehicles, automobiles, marine vessels, and the like. These embodiments may provide a system and method that controls designated operating parameters of a donating cylinder of, for example, a diesel or gasoline-powered engine relative to other non-donating cylinders in the engine to reduce an exhaust component, such as nitrogen oxide (NOx) emissions, while avoiding decreases in operating efficiency.

Figure 1:
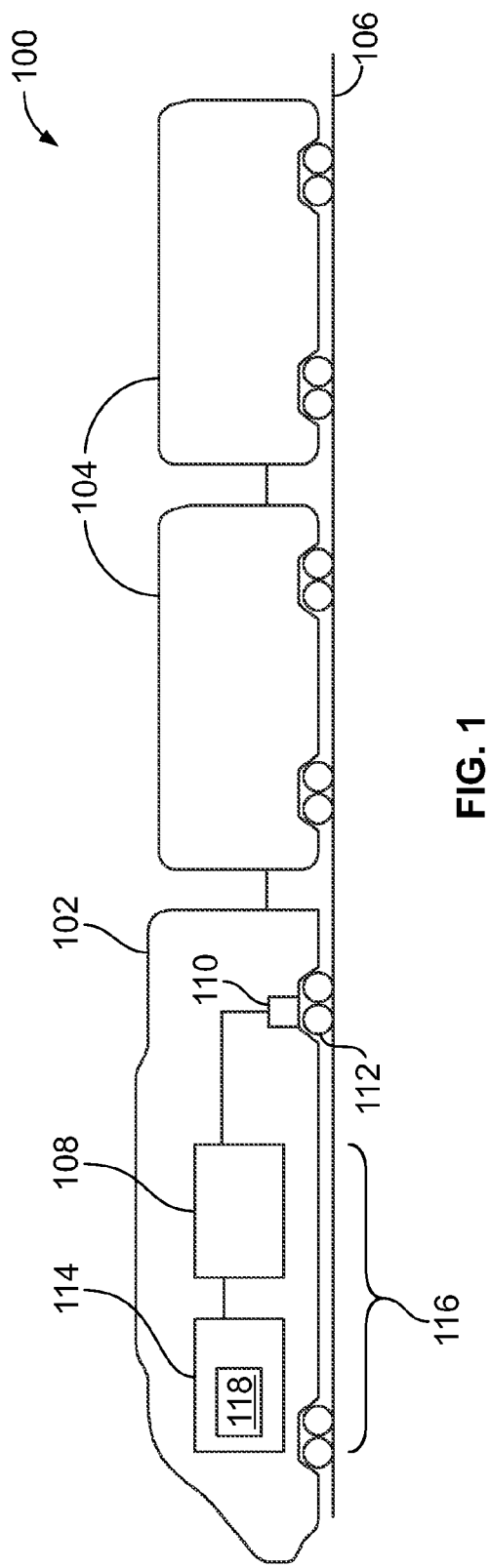
FIG. 1 is a diagram of a propulsion-generating vehicle in accordance with one embodiment.

FIG. 1 is a diagram of a vehicle system 100 in accordance with one embodiment. The vehicle system 100 includes a lead propulsion-generating vehicle 102 coupled with several trailing non-propulsion-generating vehicles (e.g., cars) 104 that travel along a route 106 (e.g., one or more rails, a road, a waterway, or the like). In one embodiment, the lead propulsion-generating vehicle 102 is a locomotive disposed at the front end of the vehicle system 100 and the trailing vehicles 104 are cargo cars for carrying passengers and/or other cargo. The lead propulsion-generating vehicle 102 includes an engine system 116, such as a diesel engine system or another type of engine system. The engine system 116 provides tractive effort to propel the vehicle system 100. The engine system 116 includes an engine 108 (e.g., a diesel engine or another type of engine) that powers traction motors 110 coupled with wheels 112 of the vehicle system 100. For example, the engine system 116 may rotate a shaft 204 (shown in FIG. 2) that is coupled with an alternator or generator (not shown). The alternator or generator creates electric current based on rotation of the shaft 204. The electric current is supplied to the traction motors 110, which turn the wheels 112 and propel the vehicle system 100.

The vehicle system 100 includes a control module or controller 114 that is communicatively coupled with the engine system 116. For example, the control module 114 may be coupled with the engine system 116 by one or more wired and/or wireless connections. The control module 114 changes designated operating parameters of the engine system 116 to change the emission of components from the engine system 116 while avoiding significant decreases in the efficiency of the engine system 116. For example, the control module 114 may switch and/or adjust designated operating parameters of the engine system 116 to decrease the NOx emission from the engine system 116 while keeping the efficiency of the engine system 116 in converting fuel into power above an efficiency threshold.

Further, the control module 114 may change the designated operating parameters as a load demand of the engine system 116 changes. The load demand represents the power demanded or required from the engine system 116. For example, the load demand on the engine system 116 may represent the horsepower required to propel the vehicle system 100 and associated cargo and/or passengers along a determined route. The load demand may change during movement of the vehicle system 100 along the route 106 due to variances in grades, speed limits, and the like, of the route 106. The control module 114 adjusts the operating parameters as the load demand changes to fall within or under emission limits while avoiding significant reductions in the efficiency of the engine system 116.

Suitable control modules 114 may include an electronic control module (ECM) and/or one or more processors, such as a computer processor, controller, microcontroller, or other type of logic device, that operates based on sets of instructions stored on a tangible and non-transitory computer readable storage medium 118. The computer readable storage medium 118 may be an electrically erasable programmable read only memory (EEPROM), simple read only memory (ROM), programmable read only memory (PROM), erasable programmable read only memory (EPROM), FLASH memory, a hard drive, or other type of computer memory. Further, the control module may communicate with a remotely located data center to exchange data, receive operating instructions and/or software version updates and patches, provide regulatory compliance information and reporting, and to provide diagnostic and/or prognostic information services.

Figure 2:
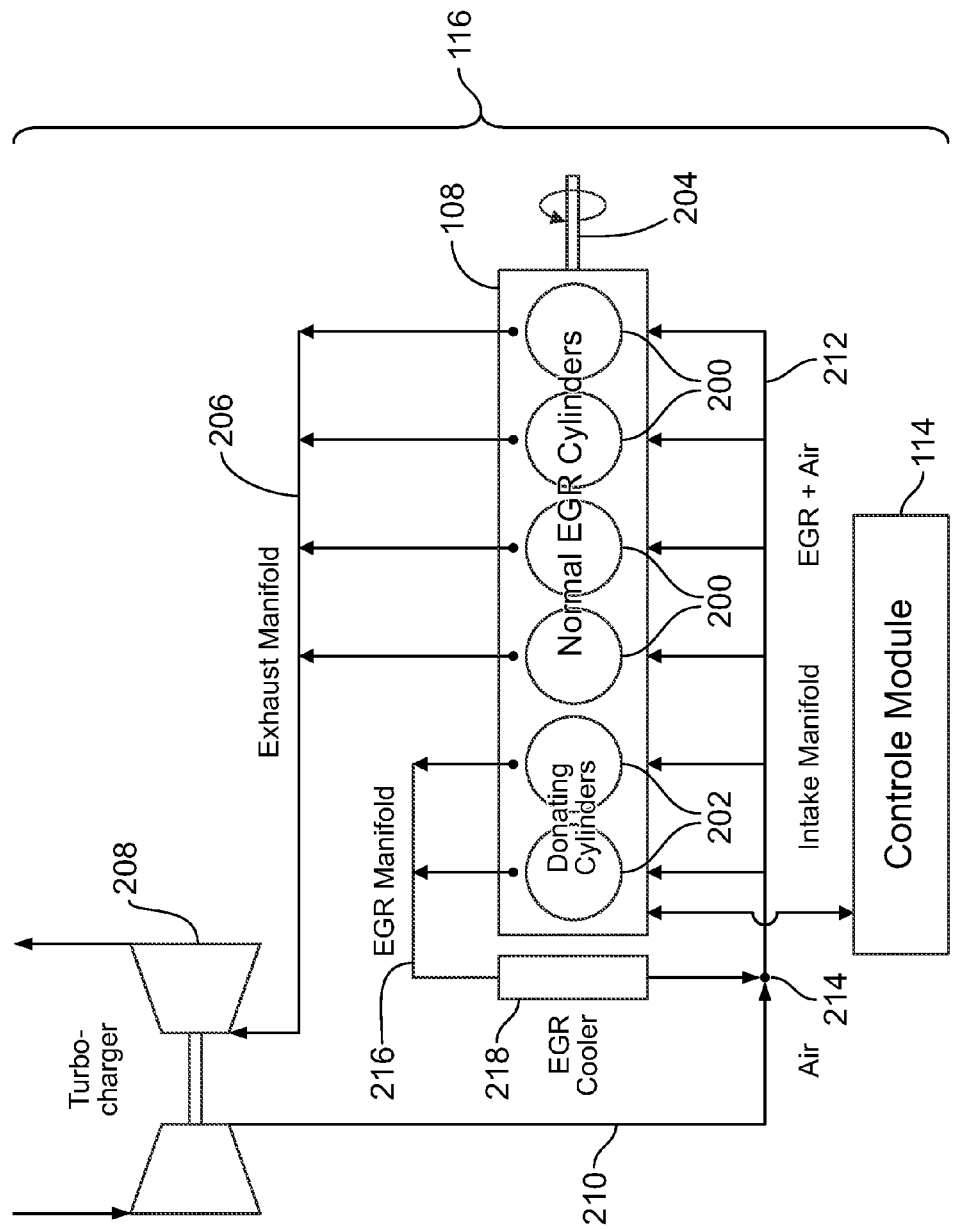
FIG. 2 is a diagram of an engine system shown in FIG. 1 in accordance with one embodiment.

FIG. 2 is a diagram of the engine system 116 in accordance with one embodiment. The engine system is coupled with the control module. The engine system includes several cylinders 200, 202, referred to herein as non-donating cylinders 200 and exhaust gas donating cylinders 202 ("Donating Cylinders"). The non-donating cylinders 200 may be exhaust gas recirculation (EGR) cylinders, which may be referred to as normal EGR cylinders. In the illustrated embodiment, the engine system includes four non-donating cylinders 200 and two donating cylinders 202. Other engine systems may include a different number of the non-donating and/or donating cylinders. Alternatively, the engine system may not include cylinders that donate exhaust gas or that receive exhaust gas to operate. Reference to donating and non-donating cylinders herein alternatively may refer to first and second sets of cylinders, without one set of cylinders donating exhaust gas to another set of cylinders and/or either set of the cylinders operating using exhaust from one or more cylinders.

With reference to the illustrated embodiment, the non-donating cylinders 200 and donating cylinders 202 include pistons 302 (shown in FIG. 3) that move within the non-donating cylinders 200 and donating cylinders 202. The movement of the pistons 302 is translated into rotation of the shaft 204. As described above, rotation of the shaft 204 is used to propel the vehicle.

The non-donating cylinders 200 are fluidly coupled with an exhaust manifold 206. The exhaust manifold 206 includes one or more conduits that direct gaseous exhaust from the non-donating cylinders 200 to a turbocharger 208. The non-donating cylinders 200 generate the gaseous exhaust as a result of the combustion of fuel in the non-donating cylinders 200. The gaseous exhaust is received by the turbocharger 208 and may be used to draw in and pump ambient air into an input manifold 210. The input manifold 210 is fluidly coupled with an intake manifold 212 of the engine system 116 by a manifold valve 214.

The donating cylinders 202 are fluidly coupled with an EGR manifold 216. By fluidly coupled, it is meant that the donating cylinders 202 are coupled with the EGR manifold 216 such that a material that flows, such as a gas or liquid, can pass or flow from the donating cylinders 202 to the EGR manifold 216. The EGR manifold 216 includes one or more conduits that direct gaseous exhaust from the donating cylinders 202 to an EGR cooler 218. The EGR cooler 218 is a device that reduces the temperature or thermal energy of the gaseous exhaust from the donating cylinders 202. For example, the EGR cooler 218 may include one or more compressors or fans that cool the gaseous exhaust from the donating cylinders 202. The EGR cooler 218 is fluidly coupled with the manifold valve 214. The manifold valve 214 fluidly couples the input manifold 210 with the EGR cooler 218 such that the gaseous exhaust of the donating cylinders 202 that is cooled by the EGR cooler 218 is mixed with the ambient air from the input manifold 210. The mixture of ambient air and the cooled gaseous exhaust may be referred to as "intake air" or the air that is received by the non-donating cylinders and/or donating cylinders.

The intake air is directed by the manifold valve 214 into the intake manifold 212. The intake manifold 212 directs the intake air to the non-donating cylinders 200 and the donating cylinders 202. The non-donating cylinders 200 and the donating cylinders 202 use the intake air to combust the fuel within the non-donating cylinders 200 and the donating cylinders 202.

Figure 3:
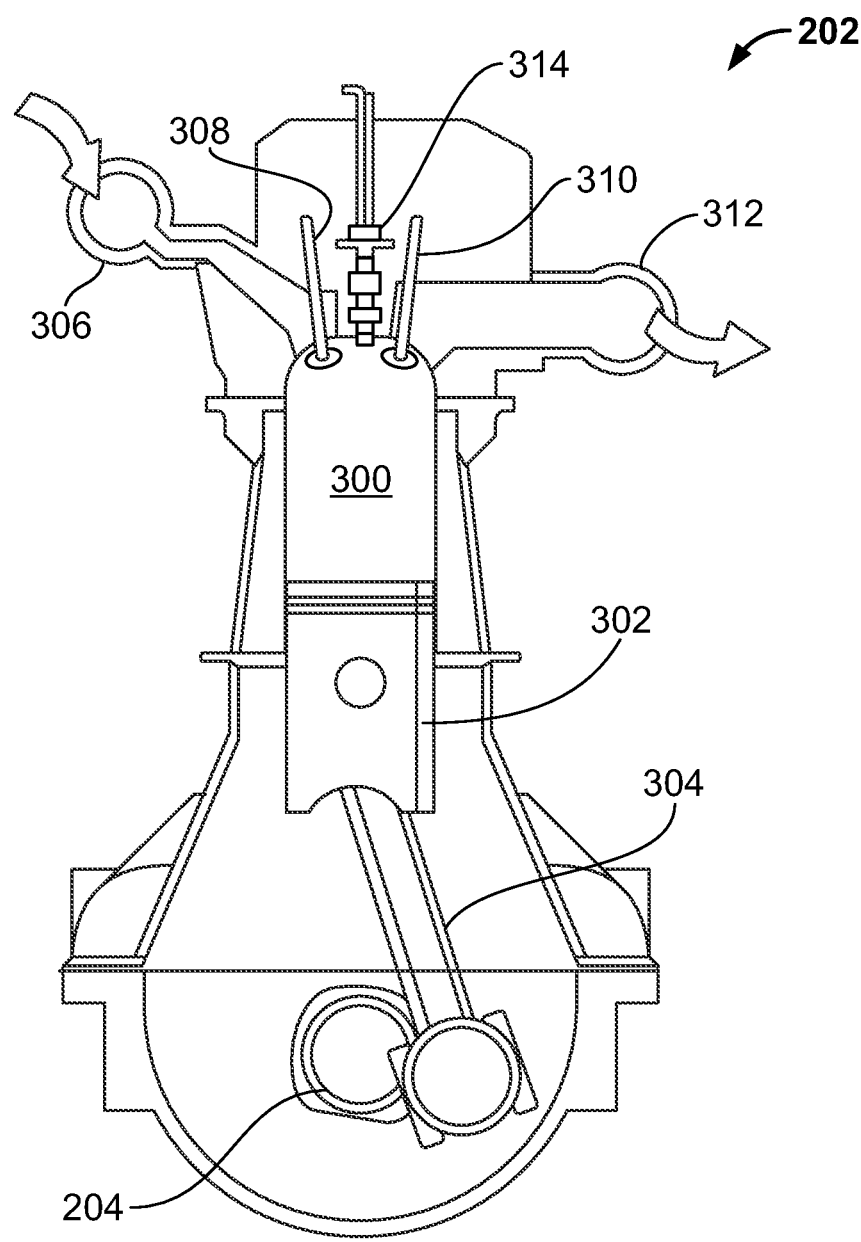
FIG. 3 is a diagram of a donating cylinder shown in FIG. 2 in accordance with one embodiment.

FIG. 3 is a diagram of one of the donating cylinders 202 in accordance with one embodiment. While the discussion of FIG. 3 focuses on the donating cylinders, the operation of the donating cylinder 202 also may apply to the non-donating cylinder (as shown in FIG. 2). The donating cylinder includes a combustion chamber 300. The piston 302 is disposed within the combustion chamber 300. In the view shown in FIG. 3, the piston 302 moves up and down within the combustion chamber 300. The piston 302 is coupled to the shaft 204 by a crankshaft 304. The crankshaft 304 converts the linear movement of the piston 302 in the combustion chamber 300 into rotation of the shaft 204. In one embodiment, the shaft 204 is a common shaft that the pistons 302 in each of the non-donating cylinders 200 (shown in FIG. 2) and donating cylinders 202 are joined to by crankshafts 304.

The donating cylinder 202 includes an intake valve 308 that opens to permit intake air to enter into the combustion chamber 300 and closes to prevent additional intake air from entering the combustion chamber 300. For example, the donating cylinder 202 may include an inlet 306 that is fluidly coupled with the intake manifold 212 (shown in FIG. 2). The intake valve 308 is disposed between the combustion chamber 300 and the inlet 306. The intake valve 308 opens to allow intake air from the intake manifold 212 to enter into the combustion chamber 300 and closes to prevent intake air from the intake manifold 212 from entering into the combustion chamber 300. The intake valve 308 may be opened or closed by the control module 114. A fixed or variable cam, such as a variable valve timing (VVT) cam (not shown), may be coupled with the intake valve 308 and configured to be operated by the control module 114 in order to open or close the intake valve 308.

The donating cylinder 202 includes an exhaust valve 310 that opens to direct gaseous exhaust in the combustion chamber 300 out of the combustion chamber 300 and closes to prevent the gaseous exhaust and/or intake air from exiting the combustion chamber 300. For example, the donating cylinder 200 may include an outlet 312 that is fluidly coupled with the exhaust manifold 206 (shown in FIG. 2). The exhaust valve 310 is disposed between the combustion chamber 300 and the outlet 312. The exhaust valve 310 opens to allow gaseous exhaust in the combustion chamber 300 to exit the combustion chamber 300 into the outlet 312 and the exhaust manifold 206. The exhaust valve 310 closes to prevent the gaseous exhaust and/or air in the combustion chamber 300 from exiting the combustion chamber 300 into the exhaust manifold 206. The exhaust valve 310 may be opened or closed by the control module 114. A fixed or variable cam, such as a variable valve timing (VVT) cam (not shown), may be coupled with the exhaust valve 310 and configured to be operated by the control module 114 in order to open or close the exhaust valve 310.

The donating cylinder 202 includes a fuel injector 314 that directs fuel, such as fuel, into the combustion chamber 300. The fuel injector 314 is disposed between a source or supply of fuel (not shown), such as a gas tank, and the combustion chamber 300. The fuel injector 314 injects the fuel into the combustion chamber 300 based on a command or instruction from the control module 114 in one embodiment.

Figure 4:
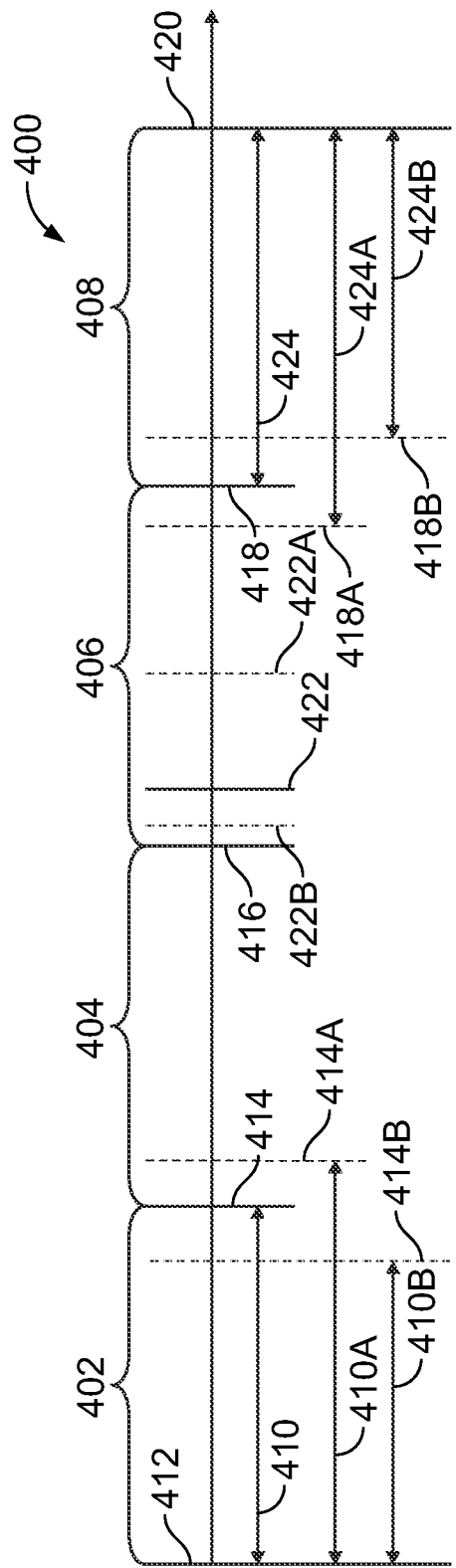
FIG. 4 illustrates a timeline of operation of the donating cylinder shown in FIG. 2 according to a multi-stroke cycle in accordance with one embodiment.

With continued reference to FIG. 3, FIG. 4 illustrates a timeline 400 of operation of the donating cylinder 202 according to a multi-stroke cycle in accordance with one embodiment. While the timeline 400 is described with respect to operation of the donating cylinders 202, alternatively the timeline 400 may apply to operation of the non-donating cylinders 200 (shown in FIG. 2).

The donating cylinder 202 operates based on a multi-stroke cycle in one embodiment. The piston 302 moves within the combustion chamber 300 during the multi-stroke cycle to rotate the shaft 204. Alternatively, the donating cylinder 202 may operate based on a different cycle. The multi-stroke cycle is shown on the timeline 400. In the illustrated embodiment, the multi-stroke cycle is a four-stroke cycle that includes an intake stroke 402, a compression stroke 404, a combustion stroke 406, and an exhaust stroke 408. Alternatively, the multi-stroke cycle may include a different number of strokes. The intake stroke 402 extends from a first time 412 to a subsequent second time 414. The compression stroke 404 extends from the second time 414 to a subsequent third time 416. The combustion stroke 406 extends from the third time 416 to a subsequent fourth time 418. The exhaust stroke 408 extends from the fourth time 418 to a subsequent fifth time 420.

During the intake stroke 402, the inlet valve 308 opens to direct intake air into the combustion chamber 300. The influx of intake air into the combustion chamber 300 drives the piston 302 away from the inlet valve 308 and toward the shaft 204. In the illustrated embodiment, the intake air moves the piston 302 downward.

Following the intake stroke 402 is the compression stroke 404. During the compression stroke 404, the piston 302 moves in an opposite direction toward the fuel injector 314. For example, in the illustrated embodiment, the piston 302 moves upward toward the top of the combustion chamber 300. As the piston 302 moves upward, the volume in the combustion chamber 300 decreases while the intake air in the combustion chamber 300 remains the same. As a result, the intake air in the combustion chamber 300 is compressed by the piston 302. The compression of the intake air heats the intake air inside the combustion chamber 300.

Following the compression stroke 404 is the combustion stroke 406. During the combustion stroke 406, fuel is injected into the combustion chamber 300 by the fuel injector 314. For example, as the piston 302 reaches or approaches the top of the combustion chamber 300, the fuel injector 314 may spray fuel into the combustion chamber 300 in the illustrated embodiment. The compressed and heated intake air in the combustion chamber 300 ignites the fuel in the combustion chamber 300. The fuel is ignited and combusts within the combustion chamber 300. The combustion of the fuel creates increased pressure within the combustion chamber 300 and forces the piston 302 away from the fuel injector 314. For example, the combustion of the fuel may force the piston 302 downward in the view shown in FIG. 3.

Following the combustion stroke 406 is the exhaust stroke 408. The combustion of the fuel within the combustion chamber 300 generates gaseous exhaust in the combustion chamber 300. The gaseous exhaust may include components such as NOx, SOx, and particulate matter (PM). During the exhaust stroke 408, the piston 302 moves back up toward the fuel injector 314 and the exhaust valve 310 opens to direct the gaseous exhaust out of the combustion chamber 300. For example, the exhaust valve 310 may open to permit the gaseous exhaust to flow from the combustion chamber 300 into the outlet 312, and from the outlet 312 into the EGR manifold 216 (shown in FIG. 2). With respect to the non-donating cylinder 200 (shown in FIG. 2), the exhaust valve 310 opens to direct the gaseous exhaust into the outlet 312 and from the outlet 312 into the exhaust manifold 206. The movement of the piston 302 forces the gaseous exhaust out of the combustion chamber 300.

The four strokes 402, 404, 406, 408 of the four-stroke cycle are repeated during operation of the engine system. For example, following the exhaust stroke 408 of a first four-stroke cycle is the intake stroke 402 of a subsequent second four-stroke cycle.

Several designated operating parameters of the donating cylinders 202 and the non-donating cylinders 200 define the valve timing, injection timing, and/or the amount of fuel used in the multi-stroke cycle. The parameters may be determined or fixed for the non-donating cylinders 200, but are variable for the donating cylinders 202 in one embodiment. For example, the designated operating parameters of the non-donating cylinders 200 may be determined and/or unchangeable, such as determined ratios of each other that do not change or do not change relative to each other based on the load demand of the engine system and/or changing emission limits. On the other hand, the designated operating parameters of the donating cylinders 202 may be adjusted relative to the designated operating parameters non-donating cylinders 200 such that the designated operating parameters of the donating cylinders 202 may be changed without changing the parameters of the non-donating cylinders 200. The designated operating parameters of the donating cylinders 202 may be adjusted to reduce the emission of select exhaust gas components by the donating cylinders 202 and/or engine system below emission limits while avoiding reductions in the efficiency of the engine system.

Several designated operating parameters of the non-donating and donating cylinders 200, 202 are described below. The list of parameters described herein is not exhaustive, but merely provides examples of parameters that may be changed for the donating cylinders 202 relative to the parameters for the non-donating cylinders 200. In one embodiment, the non-donating cylinders 200 operate according to one or more of the operating parameters discussed herein, with the operating parameters being fixed or based on other parameters. Conversely, the operating parameters for the donating cylinders 202 may be changed without changing the same operating parameters of the non-donating cylinders 200.

An intake valve closure (IVC) parameter 410 represents the time period that the intake valve 308 remains open to allow intake air to flow into the combustion chamber 300. The IVC parameter 410 may be expressed as a time period that the intake valve 308 remains open, a time that is relative to an engine rotational angle and at which the intake valve 308 is closed, and/or a valve lift of the intake valve 308. The valve lift may be a distance that the intake valve 308 is opened. The IVC parameter 410 is shown in FIG. 4 as a time period that extends from the first time 412 to the second time 414. The first time 412 may indicate the time when the intake valve 308 is opened and the second time 414 may indicate the time when the intake valve 308 is closed. The control module may change the IVC parameter 410 by increasing the IVC parameter 410 to a longer IVC parameter 410A. A longer IVC parameter 410A extends the second time 414 to a longer second time 414A in order to leave the intake valve 308 open for a longer period of time and permit a larger volume of intake air to be directed into the combustion chamber 300. Alternatively, the IVC parameter 410 may be increased by moving the first time 412 to an earlier point in time and opening the intake valve 308 earlier. The IVC parameter 410 may be shortened to a shorter or smaller IVC parameter 410B. A smaller IVC parameter 410B shortens the second time 414 to a shorter second time 414B, or a second time 414B that occurs closer to the first time 412. Alternatively, the first time 412 may occur later to shorten the IVC parameter 410. Shortening the IVC parameter 410B causes the intake valve 308 to be opened for a shorter period of time to cause a smaller volume of intake air to be directed into the combustion chamber 300.

A start of injection (SOI) parameter 422 represents the time at which the fuel injector 314 begins injecting fuel into the combustion chamber 300. For example, the SOI parameter 422 may be expressed as a time at which the fuel injector 314 commences spraying fuel into the combustion chamber 300 during the combustion stroke 406. The SOI parameter 422 may be adjusted by the control module 114 to vary when fuel is injected into the combustion chamber 300. As shown in FIG. 4, the SOI parameter 422 may be delayed to an SOI parameter 422A. A delayed SOI parameter 422A causes the fuel injector 314 to direct fuel into the combustion chamber 300 at a later point in time. The SOI parameter 422 may be changed to an SOI parameter 422B that occurs sooner, or at an earlier point in time. The SOI parameter 422B causes the fuel injector 314 to direct the fuel into the combustion chamber 300 at an earlier time.

A fueling parameter represents the amount of fuel that is injected into the combustion chamber 300 by the fuel injector 314. For example, the fueling parameter may be expressed as a volume of fuel that is directed into the combustion chamber 300 during the combustion stroke 406. The control module 114 may increase or decrease the fueling parameter. Increasing the fueling parameter causes more fuel to be injected into the combustion chamber 300 by the fuel injector 314 during the combustion stroke 406. Conversely, decreasing the fueling parameter causes less fuel to be injected into the combustion chamber 300 during the combustion stroke 406.

In one example embodiment, during operation of the engine system 116, an operator may increase the engine system load from a relatively lower load point to a relatively higher load point. The increase to the higher load point could cause the total amount of fuel that is provided by a fuel system (such as a fuel tank or storage chamber and associated pumps) to the non-donating and donating cylinders 200, 202 to increase. At a given fueling rate (such as the rate at which fuel is supplied by the fueling system to the cylinders 200, 202), the actual engine rotational speed may decrease relative to a desired or requested engine rotational speed for the higher load point. For example, the engine rotational speed that corresponds with the higher load point may not be achieved by the engine system 116. Instead, the engine system 116 may operate at a lower, actual rotational speed. The control module 114 may monitor and respond to the difference between the actual and requested rotational speeds. The control module 114 can compare the actual to desired rotational speeds to determine a difference in rotational speeds. The control module 114 may consult a look-up table function or equivalent (that may be stored in the storage medium 118) to determine a fueling rate or amount of fuel to be supplied to the donating cylinders 202. That is, the control module 114 may determine, or if a look up table is used, may return, a ratio of fueling rates applicable to the non-donating and donating cylinders 200, 202. For example, this fueling ratio may be a ratio of a fueling rate for the donating cylinders 202 to the non-donating cylinders 200. The fueling rates can be based on the requested rotational speed and/or the load operating conditions of the engine system 116. Multiplying this fueling ratio by the fueling rate for the non-donating cylinders 200 yields the fueling rate for the donor cylinders 202 in one embodiment.

An exhaust valve closure (EVC) parameter 424 represents the time period that the exhaust valve 310 remains open to allow gaseous exhaust in the combustion chamber 300 to flow out of the combustion chamber 300. For example, the EVC parameter 424 may be expressed as a time period that the exhaust valve 310 remains open. The EVC parameter 424 is shown in FIG. 4 as a time period that extends from the fourth time 418 to the fifth time 420, or over the duration of the exhaust stroke 408. The fourth time 418 may represent the time when the exhaust valve 310 is opened and the fifth time 420 may represent the time when the exhaust valve 310 is closed.

The control module 114 may change the EVC parameter 424 to increase or decrease the time period that the exhaust valve 310 is open. As shown in FIG. 4, the EVC parameter 424 may be increased to a longer EVC parameter 424A by moving the time at which the exhaust valve 310 opens, or the fourth time 418, to a fourth time 418A that occurs sooner. Alternatively, the EVC parameter 424 may be increased by moving the time at which the exhaust valve 310 closes, or the fifth time 420, to a later point in time. As the exhaust valve 310 remains open longer, a larger volume of gaseous exhaust may be directed out of the combustion chamber 300.

The EVC parameter 424 may be shortened to a shorter EVC parameter 424B by moving the time at which the exhaust valve 310 opens, or the fourth time 414, to a later fourth time 414B. Alternatively, the EVC parameter 424 may be shortened by moving the time that the exhaust valve 310 closes, or the fifth time 420, to an earlier point in time. Shortening the EVC parameter 424B causes the exhaust valve 310 to be open for a shorter period of time. As the amount of time that the exhaust valve 310 remains open is decreased, less gaseous exhaust is able to escape from the combustion chamber 300.

The IVC parameter 410, SOI parameter 412, fueling parameter, and the EVC parameter 424 may be collectively referred to as the operational parameters of the non-donating and donating cylinders 200, 202. The control module may adjust or change one or more of the operational parameters for the donating cylinders without changing one or more of the operational parameters for the non-donating cylinders. Alternatively, the control module may change an operational parameter simultaneously or concurrently for both the donating and non-donating cylinders based on a change in the operational parameters for the non-donating cylinders.

A donating cylinder may have an operational parameter that differs from another donating cylinder operational parameter. The operational parameters may be the same for all of the donating cylinders. The control module may change one or more of the operational parameters for the donating cylinders by an amount that differs from the change in the operational parameters for another donating cylinder. Alternatively, changes in the operational parameters may be the same for all of the donating cylinders.

The control module may change one or more of the operational parameters of the donating cylinders based on one or more indices of the engine system. For example, the control module may change the operational parameters based on an engine performance index. The engine performance index represents a measurement or quantifiable characterization of the operation of the engine system. In one example, the engine performance index represents a load placed on or power demand of the engine system. In another example, the engine performance index represents a speed of the engine system. The engine performance index may represent a measurement of air-flow through the engine system. In another example, the engine performance index includes a measurement of power generated by the donating cylinders 202. For example, the engine performance index may be a measurement of the horsepower generated by the donating cylinders of the engine system.

The engine performance index may include a measurement of an efficiency of the engine system. For example, the engine performance index may include a measurement of the efficiency of the donating cylinders in converting fuel into power. The engine performance index may include other measurements of the performance or operation of the engine system. In one embodiment, the engine performance index includes multiple measurements of the performance of the engine system. For example, the engine performance index may include or be based on measurements of the power generated by the donating cylinders 202 and the efficiency of the donating cylinders. One or more sensors in communication with the control module may measure the engine performance index.

Other examples of suitable parameters for determining the engine performance index may include one or more of a load placed the engine system, a speed of the engine system, a temperature of the engine system, an air-flow rate through the engine system, a temperature of air flowing through a manifold coupled to the engine system, a temperature of coolant flowing through the engine system, a requested power level demand placed on the engine system, an oxygen content of air entering the engine system, a measured atmospheric pressure adjacent to the engine system, a measured turbocharger speed, a detected turbocharger surge event, or an indication that one or more of the foregoing has a value that will imminently cross a determine threshold.

The control module may change the operational parameters for the donating cylinders based on an effluent characterization index. The effluent characterization index represents a measurement or quantifiable characterization of the gaseous exhaust generated by the non-donating and/or donating cylinders in one embodiment. In one example, the effluent characterization index includes a measurement of an exhaust volume flow rate of the gaseous exhaust from the donating cylinders. The effluent characterization index may be a measurement of the mass flow rate of the gaseous exhaust that flows from the donating cylinders 202 when the exhaust valves 310 of the donating cylinders are open. The exhaust volume flow rate may be measured by a sensor (not shown), such as a mass flow sensor coupled with the control module 114. The exhaust volume flow rate may be expressed as the mass of the gaseous exhaust from the donating cylinders 202 that passes through a surface area per unit of time. In one embodiment, the exhaust volume flow rate may be a measurement of the mass of one or more constituents in the gaseous exhaust of the donating cylinders 202 that pass through a surface per unit time. For example, the exhaust volume flow rate can represent the amount of one or more exhaust gas components, such as NOx, that could flow in the gaseous exhaust.

In another example, the effluent characterization index may include a measurement of a composition of one or more constituents of the gaseous exhaust generated by the engine system. For example, the effluent characterization index may be a concentration of one or more gaseous exhaust components generated by the non-donating and/or donating cylinders 200, 202, such as particulate matter, NOx, or SOx concentration. Alternatively, the effluent characterization index may be a measurement of an oxygen concentration of the gaseous exhaust generated by the non-donating and/or donating cylinders 200, 202.

In one embodiment, the effluent characterization index includes multiple measurements of the gaseous exhaust of the engine system. For example, the effluent characterization index may include or be based on measurements of the exhaust volume flow rate of the gaseous exhaust from the donating cylinders 202 and the concentration of one or more constituents in the gaseous exhaust from the donating cylinders 202.

The operating parameters of the cylinders 200, 202 may be controlled relative to each other or one another. For example, instead of independently controlling the operating parameters of the cylinders 200, 202 (such that a change in an operating parameter of one cylinder 200 or 202 does not result in a change in an operating parameter of another cylinder 200 or 202), the operating parameters of the cylinders 200, 202 may be controlled relative to each other.

Relative control of the operating parameters can include, responsive to changing a first operating parameter of one or more cylinders 200 and/or 202, changing the same or different (e.g., second) operating parameter of one or more other cylinders 200 and/or 202 by an amount that is different from the amount that the first operating parameter was changed. The changes in the operating parameters may be based on each other. For example, the control module 114 may change the same or different operating parameter as a fraction, multiple, or other change based on the change to the first operating parameter.

In one aspect, changes to the operating parameters of the donating cylinders 202 are based on the operating parameters or changes to the operating parameters of the non-donating cylinders 200. For example, an operating parameter of the donating cylinders 202 may not be changed unless or until the same or other operating parameter is changed for the non-donating cylinders 200. Because the non-donating cylinders 200 may contribute more exhaust than the donating cylinders 200, changing an operating parameter of the non-donating cylinders 202 can cause one or more operating parameters of the donating cylinders 200 to also change, even if the change to the one or more operating parameters of the donating cylinders 200 was not directed by the control module 114.

The control module 114 may modify one or more operating parameters of all of the cylinders 200, 200, and then examine the operating parameters of the donating cylinders 202. The control module 114 may examine the operating parameters of the donating cylinders 202 to determine if these operating parameters change by more or less than previously directed by the control module 114. For example, the control module 114 may change the intake timing of all cylinders 200, 202 by reducing the IVC parameter 410 by a designated time period. This change can cause the total intake time of the cylinders 200, 202 to be reduced by the designated time period. Responsive to this change, the control module 114 can examine the actual intake time of the donating cylinders 202 to determine if the actual intake time is modified by the same time period that the actual intake time of the non-donating cylinders 200, or if the actual intake time of the donating cylinders 202 has changed by more than the non-donating cylinders 200 or is otherwise different from the non-donating cylinders 200. If the control module 114 determines that the operating parameter of the donating cylinders 202 have not changed as directed by the control module 114 (e.g., by changing due to the influence or operation of the non-donating cylinders 200), then the control module 114 can make an additional change to the operating parameter or parameters of the donating cylinders 202.

For example, the control module 114 may direct all cylinders 200, 202 to decrease the IVC parameter 410 by a first time period. Responsive to directing this change, the cylinders 200, 202 may operate using the first time period for the IVC parameter 410. During operation, however, the actual IVC parameter 410 of the donating cylinders 202 may be different from the first time period designated by the control module 114. Responsive to determining this difference, the control module 114 may further modify the IVC parameter 410 of the donating cylinders 202 (but not of the non-donating cylinders 200) by a different, third time period such that the actual IVC parameter 410 for all of the cylinders 200, 202 is the same, or is within a designated range of each other and/or of the operating parameter commanded by the control module 114 (e.g., within 0.5% 1%, 3%, 5%, or the like).

In one embodiment, the operating parameters for the engine system are determined prior to movement of a vehicle system that includes the engine system, and are not modified during movement of the vehicle system. For example, once the operating parameters are tuned or otherwise adjusted to selected values, the operating parameters may not change. Alternatively, one or more of the operating parameters may change during movement of the vehicle system. The values of the operating parameters may be set prior to departure on a trip of the vehicle system. During movement of the vehicle system, the control module may vary the values of one or more of the operating parameters. For example, the engine system may operate using a first value for the IVC parameter 410, a second value for the SOI parameter 422, a third value for the fueling parameter, and/or a fourth value for the EVC parameter 424. During movement along the trip, the control module may change the IVC parameter 410 from the first value to a different, fifth value, change the SOI parameter 422 from the second value to a different, sixth value, change the fueling parameter from the third value to a different, seventh value, and/or change the EVC parameter 424 from the fourth value to a different, eighth value. The control module may change one or more of these operational parameters during movement of the vehicle system due to changes or values of the indices described above. For example, if the value of the engine performance index and/or the value of the effluent characterization index changes or falls outside of a designated range of values, then the control module may autonomously change the value of one or more operating parameters to change the value of the engine performance index and/or the value of the effluent characterization index to bring the value of one or more of these indices to within a designated range of values associated with the corresponding index.

Figure 6:
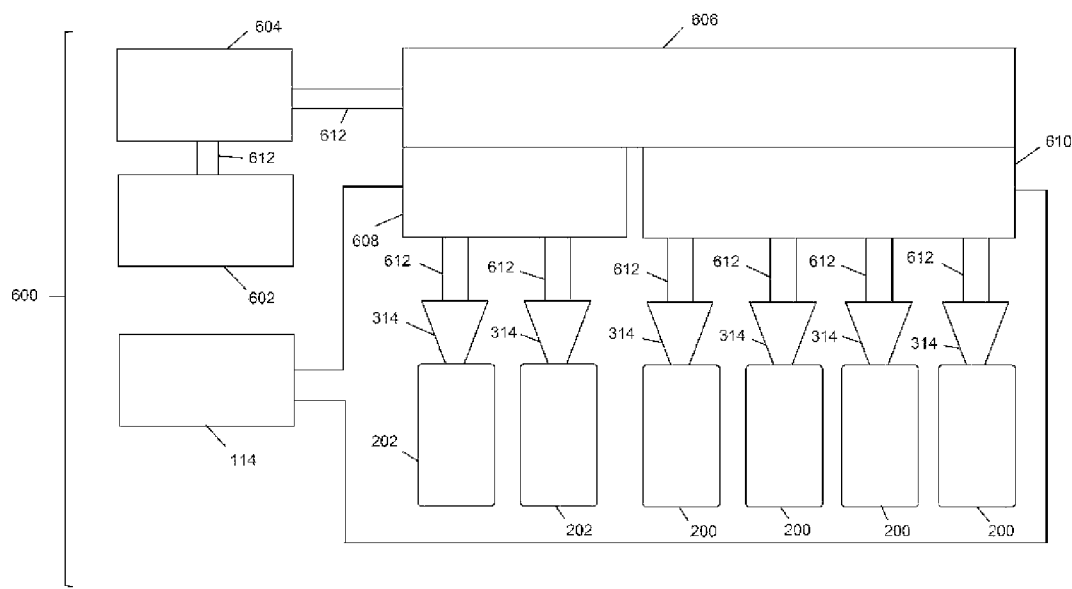
FIG. 6 illustrates a schematic diagram of another embodiment of an engine system.

FIG. 6 illustrates a schematic diagram of another embodiment of an engine system 600. The engine system 600 may represent the engine system 116 shown in FIG. 1. The engine system 600 can include the control module 114, fuel injectors 314, and donating and non-donating cylinders 200, 202 described herein. A fuel tank 602 holds fuel that is pulled from the tank 602 via operation of a fuel pump 604 (e.g., via one or more conduits 612). This fuel is supplied from the tank 602 to a fuel rail 606, which also can be referred to as a common rail.

Two or more fuel limiting devices 608, 610 are fluidly coupled with the fuel rail 606 and the fuel injectors 314 (e.g., by one or more conduits 612). The fuel limiting devices 608, 610 represent valves or other devices that control the flow of fuel from the tank 602 to the fuel injectors 314. For example, the fuel limiting devices 608, 610 can include fuel pressure limiters that control the pressure at which fuel is supplied from the tank 602 to the fuel injectors 314. The fuel limiting devices 608, 610 can restrict the flow of fuel (e.g., the fuel pressure, the rate of fuel flow, or the like) below the pressure, rate, etc. at which the fuel would otherwise flow from the pump 604 to the fuel injectors 314 via the rail 606. The control module 114 may be operably coupled with the fuel limiting devices 608, 610 by one or more wired and/or wireless connections to change the pressure, rate, etc. at which the fuel is supplied by the fuel limiting devices 608, 610. While the fuel limiting devices 608, 610 are shown as being located between the rail 606 and the fuel injectors 314, optionally, the fuel limiting devices 608, 610 may be in another location.

In the illustrated embodiment, the fuel limiting device 608 controls the fuel supplied to the donating cylinders 202 while the fuel limiting device 610 separately controls the fuel supplied to the non-donating cylinders 200. Using separate fuel limiting devices 608, 610 to control the fuel supplied to the cylinders 200, 202 provides the control module 114 with the ability to control the rate, pressure, or the like, of the fuel supplied to the donating cylinders 202 separately from the rate, pressure, or the like, of the fuel supplied to the non-donating cylinders 200. For example, the control module 114 may direct the fuel limiting device 610 to increase the rate, pressure, or the like, at which fuel from the tank 602 is supplied to the cylinders 200 while concurrently or simultaneously directing the fuel limiting device 608 to decrease the rate, pressure, or the like, at which fuel from the same tank 602 is supplied to the cylinders 202. The control module 114 may separately control the rate, pressure, or the like, at which fuel is supplied to the cylinders 200 or the cylinders 202 in order to change the values of the engine performance index and/or the effluent characterization index, as described herein.

In one aspect, the control module 114 may control one or more of the fuel limiting devices 608, 610 in order to control the air or oxygen that is received by the cylinders 202 and/or the cylinders 200. For example, the fuel limiting device 608 may be controlled to reduce the rate, pressure, amount, or the like, of the fuel that is supplied to the donating cylinders 202 in order to increase the amount of air or oxygen that is taken in by the cylinders 202 (e.g., the intake oxygen). Additionally or alternatively, the fuel limiting device 610 may be controlled to reduce the rate, pressure, amount, or the like, of the fuel that is supplied to the non-donating cylinders 200 in order to increase the amount of air or oxygen that is taken in by the cylinders 200.

Figure 5:
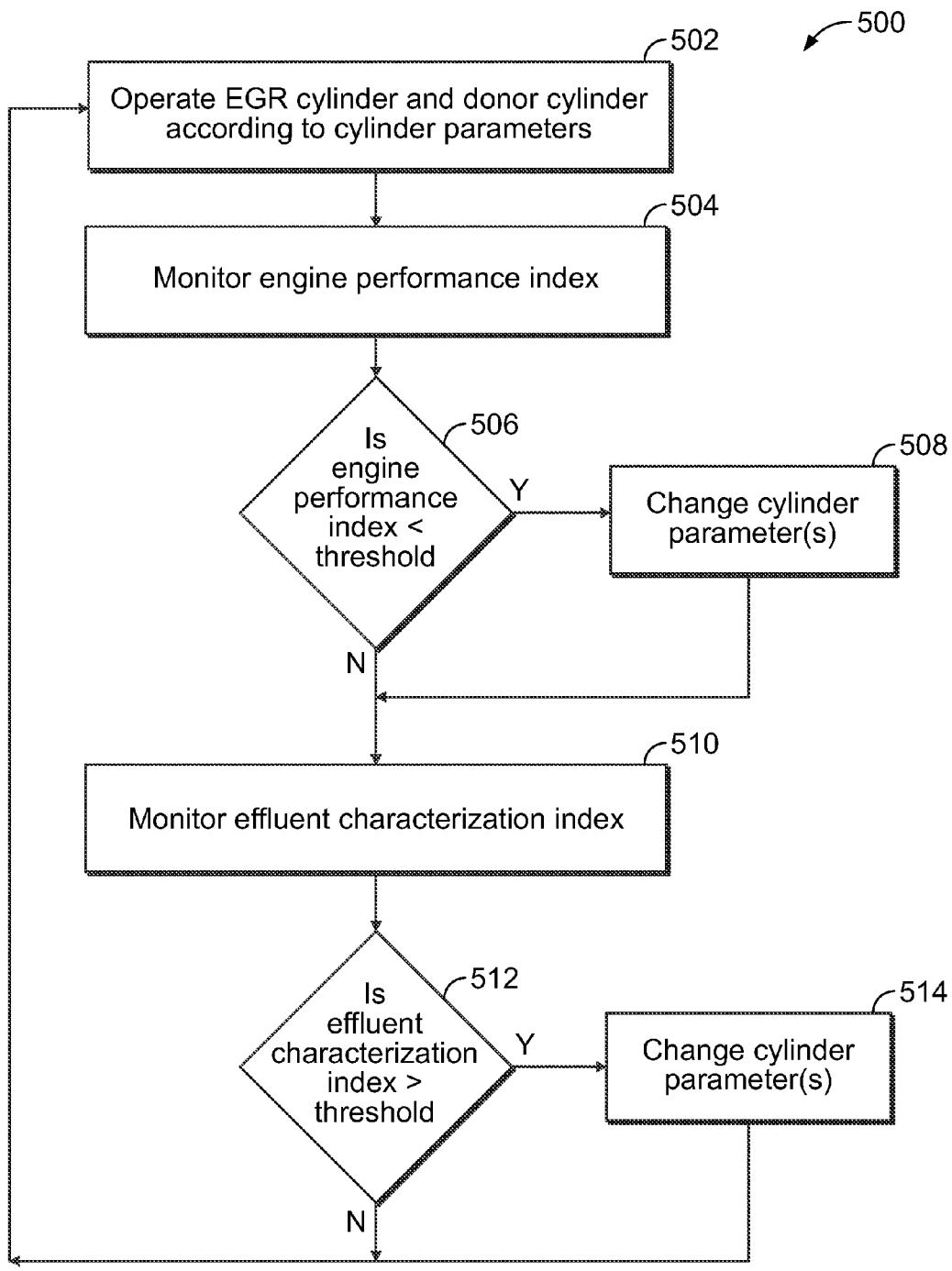
FIG. 5 is a flowchart of a control method for the engine system shown in FIG. 1 in accordance with one embodiment.

FIG. 5 is a flowchart of a control method 500 for the engine system 116 in accordance with one embodiment. The control method 500 may be used to adjust the operational parameters of the donating cylinders 202 (shown in FIG. 2) relative to the operational parameters of the non-donating cylinders 200 (shown in FIG. 2) in order to reduce the emissions from the engine system while limiting losses in the efficiency of the engine system as a result of decreasing the emission of components. A first fueling parameter for one or more donating cylinders 202 may be based on a second fueling parameter for one or more of the non-donating cylinders 200, such as by the first fueling parameter being a decimal multiplier of the second fueling parameter.

At 502, non-donating and donating cylinders of an engine are operated according to operational parameters. For example, the non-donating cylinder and the donating cylinder of the engine system are operated based on, or relative to, one or more operational parameters. The operational parameters can include, for example, the timing of the strokes 402, 404, 406, 408 and/or amount of fuel that is used to move pistons 302 (shown in FIG. 3) within the non-donating and donating cylinders 200, 202. Other operational parameters can include the IVC parameter 410 (shown in FIG. 4), the SOI parameter 422 (shown in FIG. 4), the fueling parameter, and/or the EVC parameter 424 (shown in FIG. 4).

The IVC parameter 410 (shown in FIG. 4), the SOI parameter 422 (shown in FIG. 4), and the EVC parameter 424 (shown in FIG. 4) define the timing of different events that occur during the four-stroke cycle of the movement of the pistons 302 (shown in FIG. 3) within the non-donating and donating cylinders 200, 202 (shown in FIG. 2). For example, the IVC parameter 410 defines the timing of the opening or closing of the intake valve 308 (shown in FIG. 3), the SOI parameter 422 defines the timing of the injection of fuel into the combustion chamber 300 (shown in FIG. 3) of the non-donating and donating cylinders 200, 202, and the EVC parameter 424 defines the timing of the opening or closing of the exhaust valve 310 (shown in FIG. 3). The fueling parameter defines the amount of fuel that is injected into the combustion chambers 300.

At 504, an engine performance index is monitored. For example, the control module 114 may measure the engine performance index as the power generated by the donating cylinders 202 (shown in FIG. 2) and/or the efficiency of the donating cylinders 202 in converting the fuel injected into the donating cylinders 202 into power. The control module 114 may periodically measure the power and/or efficiency of the donating cylinders 202 to repeatedly monitor the engine performance index of the donating cylinders 202.

At 506, the engine performance index is compared to one or more thresholds. For example, the engine performance index may include a measurement of the power generated by the donating cylinders 202 (shown in FIG. 2) that is compared to a power threshold. If the power generated by the donating cylinders 202 exceeds the power threshold, then the engine performance index may indicate that the operation of the donating cylinders 202 based on the current operational parameters is generating sufficient power. For example, the power generated by the donating cylinders 202 may be sufficient to meet the load demand placed on the engine system by the rail vehicle 100.

Conversely, if the engine performance index does not exceed the power threshold, then the engine performance index may indicate that the operation of the donating cylinders 202 (shown in FIG. 2) based on the current operational parameters may be insufficient to generate sufficient power to meet the load demand of the engine system. As a result, one or more of the operational parameters of the donating cylinders 202 may need to be adjusted to increase the power that is output by the donating cylinders 202.

In another example, the engine performance index may include a measurement of the efficiency of the donating cylinders 202 (shown in FIG. 2) that is compared to an efficiency threshold. If the efficiency of the donating cylinders 202 exceeds the efficiency threshold, then the engine performance index may indicate that the operation of the donating cylinders 202 based on the current operational parameters is operating at a sufficiently high efficiency. On the other hand, if the engine performance index does not exceed the efficiency threshold, then the engine performance index may indicate that the current operational parameters of the donating cylinders 202 may need to be adjusted in order to increase the efficiency of the donating cylinders 202.

In one embodiment, more than one engine performance index is compared to an associated threshold. For example, the power generated by the donating cylinders 202 (shown in FIG. 2) may be compared to a power threshold while the efficiency of the donating cylinders 202 is compared to an efficiency threshold. If at least a determined number of the engine performance indices exceed the associated thresholds, then the engine performance indices may indicate that the operational parameters do not need to be changed to improve the engine performance indices. Alternatively, if less than the determined number of the engine performance indices exceeds the associated thresholds, the engine performance indices may indicate that the operational parameters need to be changed to improve the engine performance indices.

If the engine performance index does not exceed the associated threshold(s), then flow of the method 500 proceeds to 508. If the engine performance index or indices do exceed the associated threshold(s), the flow of the method 500 proceeds to 510.

At 508, one or more of the operational parameters are changed to increase the engine performance index. For example, one or more operational parameters of the donating cylinders 202 (shown in FIG. 2) is changed by the control module 114 in order to increase the power generated by the donating cylinders 202 and/or the efficiency of the donating cylinders 202. In one embodiment, the IVC parameter 410 (shown in FIG. 4) is increased to inject more intake air into the combustion chambers 300 (shown in FIG. 3) of the donating cylinders 202. The increased amount of intake air in the combustion chambers 300 may increase the pressure inside the combustion chambers 300 and increase the power and/or efficiency of the donating cylinders 202. In one aspect, the one or more operational parameters can be changed while the vehicle system is moving.

The fueling parameter may be changed to increase the power and/or efficiency of the donating cylinders 202 (shown in FIG. 2). For example, the fueling parameter may be increased to inject more fuel during the combustion stroke 406 (shown in FIG. 4). As more fuel is injected into the combustion chambers 300 (shown in FIG. 3) of the donating cylinders 202, the combustion of the fuel may create greater pressure in the combustion chambers 300 and drive the pistons 302 (shown in FIG. 3) downward with more force. Consequently, the shaft 204 (shown in FIG. 2) may be rotated with more torque by the pistons 302. As the shaft 204 rotates with more torque, more power or electric current is generated.

In another example, the fueling parameter may be decreased so that less fuel is injected into the combustion chambers 300 (shown in FIG. 3) of the donating cylinders 202 (shown in FIG. 2) during the combustion stroke 406 (shown in FIG. 4). Decreasing the fuel that is injected into the donating cylinders 202 may result in lower pressure and a higher air-fuel ratio. Also, burning less fuel in the donating cylinders 202 (shown in FIG. 2) that may provide for operation of the donating cylinders 202 at lower efficiency compared to the non-donating cylinders 200 may increase the efficiency of the engine system.

The SOI parameter 422 (shown in FIG. 4) may be changed to increase the power and/or efficiency of the donating cylinders 202 (shown in FIG. 2). For example, the SOI parameter 422 may be changed so that fuel is injected into the combustion chambers 300 (shown in FIG. 3) of the donating cylinders 202 at an earlier time. Injecting the fuel into the combustion chambers 300 at an earlier time may increase the pressure generated when the fuel is combusted in the combustion chambers 300. As the pressure increases, the pistons 302 (shown in FIG. 3) may generate greater power, as described above.

While certain examples of changing different operational parameters of the donating cylinders 202 (shown in FIG. 2) in order to change the engine performance index are described above, alternatively other operating parameters of the donating cylinders 202 may be changed based on the engine performance index or indices.

At 510, an effluent characterization index is monitored. The control module 114 may monitor the effluent characterization index by measuring the exhaust volume flow rate at which the gaseous exhaust flows from the donating cylinders 202 (shown in FIG. 2) and/or the concentration of one or more components in the gaseous exhaust coming from the donating cylinders 202. The control module 114 may periodically measure the exhaust volume flow rate and/or the component concentration of the donating cylinders 202 to repeatedly monitor the effluent characterization index of the donating cylinders 202.

At 512, the effluent characterization index is compared to one or more thresholds. For example, the effluent characterization index may include the exhaust volume flow rate of the gaseous exhaust from the donating cylinders 202 that is compared to a flow rate threshold. If the measured exhaust volume flow rate exceeds the flow rate threshold, then the effluent characterization index may indicate that the operation of the donating cylinders 202 based on the current operational parameters is generating too much gaseous exhaust, or that the gaseous exhaust is being produced at a relatively large rate. As the amount of the gaseous exhaust flowing from the donating cylinders 202 increases, the amount of the exhaust component concentration generated by the engine system may increase. Consequently, one or more of the operational parameters of the donating cylinders 202 may need to be adjusted to reduce the exhaust volume flow rate of the gaseous exhaust generated by the donating cylinders 202.

The flow rate threshold may be a determined rate and/or may be based on a location of the engine system. For example, the vehicle may travel through areas having different standards or thresholds for the exhaust component concentrations. As the rail vehicle 100 enters an area with a different standard or threshold, the flow rate threshold may be adjusted to the threshold of the area. The areas may be defined by GPS location, geo-fencing, ambient measurements, wayside or curbside signaling devices, and the like.

Conversely, if the effluent characterization index does not exceed the flow rate threshold, then the effluent characterization index may indicate that the exhaust volume flow rate is sufficiently low that the current operational parameters do not need to be adjusted. For example, the donating cylinders 202 may be generating sufficiently small amounts of gaseous exhaust based on the current operational parameters that the operational parameters do not need to be adjusted to reduce the exhaust volume flow rate.

In another example, the effluent characterization index may include a measurement of the concentration of one or more components in the gaseous exhaust generated by the donating cylinders 202. The component concentration is compared to one or more concentration thresholds to determine if the gaseous exhaust includes too high of a component concentration. If the component concentration exceeds the concentration threshold, then the effluent characterization index may indicate that the operation of the engine system, based on the current operational parameters, is generating too much of a particular component. For example, the donating cylinders may be generating too much NOx. As a result, one or more operational parameters of the donating cylinders may need to be adjusted to reduce the NOx concentration in the gaseous exhaust coming from the engine system. Similar to the flow rate threshold, the concentration threshold may change based on the location or ambient conditions of the vehicle.

On the other hand, if the effluent characterization index does not exceed the concentration threshold, then the effluent characterization index may indicate that the current operational parameters do not need to be adjusted, or may be adjusted to increase efficiency. For example, the engine system may be generating gaseous exhaust that has relatively low concentrations of one or more components based on the current operational parameters. As a result, the operational parameters of the donating cylinders may not need to be changed or may be changed to increase efficiency while increasing the component concentration up to, but not exceeding, the defined threshold.

In one embodiment, more than one effluent characterization index is compared to an associated threshold. For example, the exhaust volume flow rate of the gaseous exhaust generated by the donating cylinders 202 may be compared to a flow rate threshold while the component concentration of the gaseous exhaust form the donating cylinders 202 may be compared to a concentration threshold. If at least a determined number of the effluent characterization indices exceed the associated thresholds, then the effluent characterization indices may indicate that the operational parameters may need to be changed to improve the effluent characterization indices. Alternatively, if less than the determined number of the effluent characterization indices exceeds the associated thresholds, then the effluent characterization indices may not indicate that the operational parameters need to be changed to improve the effluent characterization indices.

If the effluent characterization index does not exceed the associated threshold(s), then flow of the method 500 returns to 502, where the engine system continues to operate based on the operational parameters that may or may not have been adjusted based on the method 500. If the effluent characterization index does exceed the associated threshold(s), the flow of the method 500 proceeds to 514.

At 514, one or more of the operational parameters of the donating cylinders 202 are changed. The operational parameters may be changed to reduce the exhaust volume flow rate of the gaseous exhaust generated by the donating cylinders 202 and/or to reduce the component concentration in the gaseous exhaust generated by the donating cylinders 202. In one aspect, the one or more operational parameters may be changed while the vehicle system is moving.

In one embodiment, the IVC parameter 410 (shown in FIG. 4) is changed to reduce the exhaust volume flow rate of the gaseous exhaust from the donating cylinders 202. The IVC parameter 410 may be decreased to inject less air into the combustion chambers 300 (shown in FIG. 3). The donating cylinders create relatively less gaseous exhaust in response to a decreased amount of air in the combustion chambers 300 in the donating cylinders 202. If the exhaust volume flow rate of the gaseous exhaust from the donating cylinders 202 exceeds the flow rate threshold, then the IVC parameter 410 may be reduced to decrease the exhaust volume flow rate.

The SOI parameter 422 (shown in FIG. 4) may be changed to reduce the exhaust volume flow rate and/or the component concentration of the gaseous exhaust created by the donating cylinders 202. For example, changing the SOI parameter 422 such that the fuel is injected into the combustion chambers 300 (shown in FIG. 3) of the donating cylinders 202 at a later time may decrease the pressure inside the combustion chambers 300. Decreasing the pressure also may reduce the component concentration of the gaseous exhaust.

The fueling parameter may be changed to adjust power, pressure and the concentration of combustion gases in the exhaust created by the donating cylinders 202. For example, increasing the fueling parameter such that more fuel is injected into the combustion chambers 300 (shown in FIG. 3) of the donating cylinders 202 may reduce the amount of oxygen that remains in the gaseous exhaust while increasing the concentration of carbon dioxide ($CO_2$) and water. Reducing the amount of oxygen and increasing the amount of combustion gases in the exhaust gases to be recirculated may prevent oxides of nitrogen (NOx) from forming in the gaseous exhaust of the non-donating cylinders 200.

Once the operational parameters are changed, flow of the method 500 returns to 502, where the donating cylinders 202 continue to operate based on the operational parameters that were adjusted based on the method 500. The method 500 may continue to operate in a loop-wise or feedback loop with the operational parameters being adjusted based on engine performance indices and/or effluent characterization indices in order to reduce the components generated by the donating cylinders 202 while avoiding significant decreases in the efficiency of the donating cylinders 202. For example, the operational parameters may be periodically changed to meet both emission and efficiency targets of the engine system. The method 500 may change the operational parameters to meet the emission and efficiency thresholds or targets as the power demanded by the engine system to propel the rail vehicle 100 changes.

In addition to or as an alternative to the feedback loop described above in connection with the method 500, the operational parameters may be controlled or varied based on a characteristic map and engine parameters such as speed and load as well as desired emission limits. For example, the control module 114 may vary one or more of the operational parameters based on the speed of the engine system, the load demand on the engine system, and/or a determined emission limit. The characteristic map may provide for the value or setting of one or more of the operational parameters based on different values of the speed, load demand, and/or emission limits. When the speed, load demand, and/or emission limit changes, the control module 114 may refer to the characteristic map to determine new or adjusted values for the operational parameters. The characteristic map may be stored on and accessible from the computer readable storage medium 118.

In order to meet both emission and efficiency targets of the engine system, however, the method 500 may attempt to change one or more operational parameters in opposite ways. For example, at 508, in order to increase the engine performance index, the method 500 may determine that the IVC parameter 410 (shown in FIG. 4) should be lengthened to increase the amount of intake air received by the combustion chambers 300 (shown in FIG. 3) and the pressure inside the combustion chambers 300. But, at 514, in order to decrease the effluent characterization index, the method 500 also may determine that the IVC parameter 410 should be shortened to decrease the amount of intake air received by the combustion chambers 300 and the pressure inside the combustion chambers 300.

In one embodiment, the method 500 applies priority criteria or rules to the opposite changes to the operational parameters that are determined by the method 500. For example, the method 500 may give priority to changes to the operational parameters that are based on comparisons of the effluent characterization index to thresholds over changes to the operational parameters that are based on comparisons of the engine performance index to thresholds. If a change to an operational parameter that is based on a comparison of an effluent characterization index to a threshold opposes or otherwise conflicts with a change to the operational parameter that is based on a comparison of an engine performance index to a threshold, then the change that is based on the effluent characterization index is applied to the operational parameter while the change based on the engine performance index is not applied. Alternatively, if a change to an operational parameter that is based on a comparison of an engine performance index to a threshold opposes or otherwise conflicts with a change to the operational parameter that is based on a comparison of an effluent characterization index to a threshold, then the change that is based on the engine performance index is applied to the operational parameter while the change based on the effluent characterization index is not applied.

Figure 7:
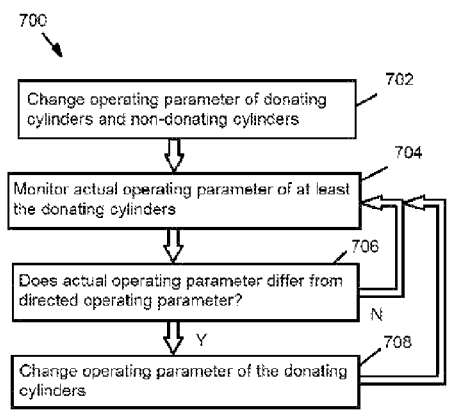
FIG. 7 illustrates a flowchart of another embodiment of a control method for controlling operation of an engine system having one or more donating cylinders and one or more non-donating cylinders.

FIG. 7 illustrates a flowchart of another embodiment of a control method 700 for controlling operation of an engine system having one or more donating cylinders and one or more non-donating cylinders. The method 700 may be used to control operation of the engine systems described herein. At 702, one or more operating parameters of one or more donating cylinders and one or more non-donating cylinders in the engine system are changed. For example, the same operating parameter may be changed by the same amount or to the same value for all of the donating and non-donating cylinders in the engine system. Optionally, the operating parameter may be changed for one or more, but not all, of the cylinders.

At 704, operating parameters of the cylinders are monitored. For example, the control module can measure the actual performance of at least the cylinders donating cylinders to determine if the operating parameters are the same as, or within the designated range of, the designated operating parameter commanded by the control module (e.g., at 702) and/or within the operating parameter of the other cylinders.

At 706, a determination is made as to whether the operating parameter or parameters being monitored differ from the designated operating parameter directed or commanded (e.g., at 702). For example, the operating parameter of one or more of the donating cylinders may be compared to the operating parameter commanded by the control module at 702 and/or to the operating parameters of the non-donating cylinders. If the operating parameter of the donating cylinders is not the same as or is not within the designated range of the commanded operating parameter and/or of the actual operating parameters of the non-donating cylinders, then the operating parameter of the donating cylinders may need to be modified. As a result, flow of the method 700 can proceed to 708.

If, on the other hand, the operating parameter of the donating cylinders is the same as or within the designated range of the commanded operating parameter or the operating parameters of the non-donating cylinders, then further modification of the operating parameter of the donating cylinders may not need to be made. As a result, flow of the method 700 can return to 704 for additional monitoring of the operating parameters. In one embodiment, if an additional change to one or more of the operating parameters is to be made, then flow of the method 700 can return to 702.

At 708, the operating parameter of the donating cylinder or cylinders is changed again. For example, in response to the actual operating parameter of the donating cylinders drifting or moving away from the operating parameter of the non-donating cylinders and/or the operating parameter commanded by the control module, the operating parameter of the donating cylinders may be tuned or fine-tuned. In one aspect, the operating parameter may be changed only for the donating cylinders, and not for any of the non-donating cylinders. This can result in the operating parameter of all of the cylinders being designated (e.g., set) by the control module, the control module monitoring an actual operating parameter of the cylinders, and, responsive to a subset of the cylinders (e.g., the donating cylinders) having an actual operating parameter that differs from the operating parameter designated by the control module, the control module modifying the operating parameter of only the subset of the cylinders relative to the operating parameter of the cylinders outside of the subset.

The operating parameter may be changed to cause the actual operating parameter of the donating cylinders to be the same as or within the designated range of the operating parameter previously commanded (e.g., at 702) and/or the actual operating parameter of the non-donating cylinders. In one aspect, the operating parameter of one or more of the donating cylinders may be changed without altering the operating parameter of the non-donating cylinders. Flow of the method 700 can return toward 704 so that additional monitoring and/or modification of the operating parameters of the donating cylinders can be performed. In one embodiment, if an additional change to one or more of the operating parameters is to be made, then flow of the method 700 can return to 702.

In one embodiment, a system (e.g., an engine system) includes a first set of one or more cylinders, a second set of one or more cylinders, and a control module. The first set of the one or more cylinders is configured to operate according to one or more designated operating parameters. The second set of one or more cylinders also is configured to operate according to the one or more designated operating parameters. The control module is configured to designate the one or more designated operating parameters of the cylinders in the first and second sets, monitor one or more operating parameters of the first set of the one or more cylinders, and, responsive to the one or more operating parameters of the first set of the one or more cylinders differing from the one or more designated operating parameters designated by the control module for the first and second sets of the cylinders, modify the one or more designated operating parameters of the first set of the one or more cylinders.

In one aspect, the control module can be configured to modify the one or more designated operating parameters of the first set of the one or more cylinders responsive to the one or more operating parameters of the first set of the one or more cylinders differing from the one or more designated operating parameters designated by the control module by modifying only the one or more designated operating parameters of the first set of the one or more cylinders and not modifying the one or more designated operating parameters of the second set of the one or more cylinders.

In one aspect, the control module can be configured to one or more of designate the one or more designated operating parameters of the cylinders in the first and second sets and/or modify the one or more designated operating parameters of the first set of the one or more cylinders during movement of a vehicle that includes the first and second sets of the cylinders.

In one aspect, the one or more cylinders in the first set can include donating cylinders configured to provide exhaust to the one or more cylinders in the second set during an intake cycle of the one or more cylinders in the second set.

In one aspect, the one or more cylinders in the second set can include non-donating cylinders that are not configured to provide exhaust to the cylinders in either the first set or the second set.

In one aspect, the one or more designated operating parameters that are designated by the control module can include one or more of an intake valve closure (IVC) parameter that defines when an intake valve of one or more of the cylinders is opened or closed, an exhaust valve closure (EVC) parameter that defines when an exhaust valve of one or more of the cylinders is opened or closed, and/or a start of injection (SOI) parameter that defines when fuel is injected into one or more of the cylinders.

In one aspect, the system also can include first and second fuel limiting devices, the first fuel limiting device can be configured to be fluidly coupled with the one or more cylinders in the first set and the separate, second fuel limiting device can be configured to be fluidly coupled with the one or more cylinders in the second set. The first fuel limiting device and the second fuel limiting device can separately control supply of fuel to the one or more cylinders in the respective first and second sets.

In one aspect, the first fuel limiting device can be configured to supply a smaller amount of the fuel to the one or more cylinders in the first set than the second fuel limiting device is configured to supply to the one or more cylinders in the second set.

In another embodiment, a method (e.g., a control method for an engine system) includes designating one or more designated operating parameters for cylinders that include one or more cylinders in a first set of cylinders of an engine system and one or more cylinders in a second set of the cylinders of the engine system, monitoring one or more operating parameters of the one or more cylinders in the first set, and, responsive to the one or more operating parameters of the first set of the one or more cylinders differing from the one or more designated operating parameters designated for the cylinders, modifying the one or more designated operating parameters of the one or more cylinders in the first set.

In one aspect, modifying the one or more designated operating parameters can include modifying only the one or more designated operating parameters of the first set of the one or more cylinders and not modifying the one or more designated operating parameters of the second set of the one or more cylinders.

In one aspect, one or more of designating and/or modifying the one or more designated operating parameters can occur during movement of a vehicle that includes the first and second sets of the cylinders.

In one aspect, the method also includes directing exhaust provided by the one or more cylinders in the first set to the one or more cylinders in the second set during an intake cycle of the one or more cylinders in the second set.

In one aspect, the one or more designated operating parameters can include one or more of an intake valve closure (IVC) parameter that defines when an intake valve of one or more of the cylinders is opened or closed, an exhaust valve closure (EVC) parameter that defines when an exhaust valve of one or more of the cylinders is opened or closed, and/or a start of injection (SOI) parameter that defines when fuel is injected into one or more of the cylinders.

In one aspect, the method also can include controlling supply of fuel to the one or more cylinders in the first set separately from the fuel that is supplied to the one or more cylinders in the second set.

In one aspect, controlling the supply of fuel can include supplying a smaller amount of the fuel to the one or more cylinders in the first set than the fuel that is supplied to the one or more cylinders in the second set.

In another embodiment, a system (e.g., an engine system) includes one or more donating cylinders, one or more non-donating cylinders, and a control module. The one or more donating cylinders are configured to generate exhaust during operation of the one or more donating cylinders. The one or more non-donating cylinders are configured to receive at least some of the exhaust during an intake cycle of the one or more non-donating cylinders. The control module is configured to designate a designated operating parameter of the one or more donating cylinders and the one or more non-donating cylinders, to monitor an operating parameter of the one or more donating cylinders, and, responsive to the operating parameter differing from the designated operating parameter designated by the control module, modifying the designated operating parameter of the one or more donating cylinders.

In one aspect, the control module can be configured to modify the designated operating parameter of only the one or more donating cylinders responsive to the operating parameter differing from the designated operating parameter designated by the control module.

In one aspect, the control module can be configured to one or more of designate or modify the designated operating parameter during movement of a vehicle that includes the one or more donating cylinders and the one or more non-donating cylinders.

In one aspect, the designated operating parameter that is designated by the control module can include one or more of an intake valve closure (IVC) parameter that defines when an intake valve of the one or more donating cylinders and the one or more non-donating cylinders is opened or closed, an exhaust valve closure (EVC) parameter that defines when an exhaust valve of the one or more donating cylinders and the one or more non-donating cylinders is opened or closed, and/or a start of injection (SOI) parameter that defines when fuel is injected into the one or more donating cylinders and the one or more non-donating cylinders.

In one aspect, the system also can include a first fuel limiting device and a separate, second fuel limiting device. The first fuel limiting device can be configured to be fluidly coupled with the one or more donating cylinders. The second fuel limiting device can be configured to be fluidly coupled with the one or more non-donating cylinders. The first fuel limiting device and the second fuel limiting device can separately control supply of fuel to the respective one or more donating cylinders and the one or more non-donating cylinders.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain- English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a first set of one or more cylinders configured to operate according to one or more designated operating parameters;
a second set of one or more cylinders also configured to operate according to the one or more designated operating parameters; and
a control module configured to designate the one or more designated operating parameters of the cylinders in the first and second sets, monitor one or more monitored operating parameters of the first set of the one or more cylinders, and modify the one or more designated operating parameters of the first set of the one or more cylinders responsive to the one or more monitored operating parameters of the first set of the one or more cylinders being different than the one or more designated operating parameters designated by the control module for the first and second sets of the cylinders.

2. The system of claim 1, wherein the control module is configured to modify the one or more designated operating parameters of the first set of the one or more cylinders by modifying only the one or more designated operating parameters of the first set of the one or more cylinders and not modifying the one or more designated operating parameters of the second set of the one or more cylinders.

3. The system of claim 1, wherein the control module is configured to, during movement of a vehicle that includes the first and second sets of the cylinders, one or more of:
designate the one or more designated operating parameters of the cylinders in the first and second sets, or
modify the one or more designated operating parameters of the first set of the one or more cylinders.

4. The system of claim 1, wherein the one or more cylinders in the first set include donating cylinders configured to provide exhaust to the one or more cylinders in the second set during an intake cycle of the one or more cylinders in the second set.

5. The system of claim 4, wherein the one or more cylinders in the second set include non-donating cylinders that are not configured to provide exhaust to the cylinders in either the first set or the second set.

6. The system of claim 1, wherein the one or more designated operating parameters that are designated by the control module include one or more of:
an exhaust valve closure parameter that defines when an exhaust valve of one or more of the cylinders is opened or closed, or
a start of injection parameter that defines when fuel is injected into one or more of the cylinders.

7. The system of claim 1, further comprising:
a first fuel limiting device configured to be fluidly coupled with the one or more cylinders in the first set; and
a separate, second fuel limiting device configured to be fluidly coupled with the one or more cylinders in the second set,
wherein the first fuel limiting device and the second fuel limiting device separately control supply of fuel to the one or more cylinders in the respective first and second sets.

8. The system of claim 7, wherein the first fuel limiting device is configured to supply a smaller amount of the fuel to the one or more cylinders in the first set than the second fuel limiting device is configured to supply to the one or more cylinders in the second set.

9. A method comprising:
designating one or more designated operating parameters for cylinders that include one or more cylinders in a first set of cylinders of an engine system and one or more cylinders in a second set of the cylinders of the engine system;
monitoring one or more monitored operating parameters of the one or more cylinders in the first set; and
modifying the one or more designated operating parameters of the one or more cylinders in the first set responsive to the one or more monitored operating parameters of the first set of the one or more cylinders being different than the one or more designated operating parameters.

10. The method of claim 9, wherein modifying the one or more designated operating parameters includes modifying only the one or more designated operating parameters of the first set of the one or more cylinders and not modifying the one or more designated operating parameters of the second set of the one or more cylinders.

11. The method of claim 9, wherein one or more of designating or modifying the one or more designated operating parameters occurs during movement of a vehicle that includes the first and second sets of the cylinders.

12. The method of claim 9, further comprising directing exhaust provided by the one or more cylinders in the first set to the one or more cylinders in the second set during an intake cycle of the one or more cylinders in the second set.

13. The method of claim 9, wherein the one or more designated operating parameters include one or more of:
an exhaust valve closure parameter that defines when an exhaust valve of one or more of the cylinders is opened or closed, or
a start of injection parameter that defines when fuel is injected into one or more of the cylinders.

14. The method of claim 9, further comprising controlling supply of fuel to the one or more cylinders in the first set separately from the fuel that is supplied to the one or more cylinders in the second set.

15. The method of claim 14, wherein controlling the supply of fuel includes supplying a smaller amount of the fuel to the one or more cylinders in the first set than the fuel that is supplied to the one or more cylinders in the second set.

16. A system comprising:
one or more donating cylinders configured to generate exhaust during operation of the one or more donating cylinders;
one or more non-donating cylinders configured to receive at least some of the exhaust during an intake cycle of the one or more non-donating cylinders; and
a control module configured to designate a designated operating parameter of the one or more donating cylinders and the one or more non-donating cylinders, to monitor an monitored operating parameter of the one or more donating cylinders, and to modify the designated operating parameter of the one or more donating cylinders responsive to the monitored operating parameter differing from the designated operating parameter.

17. The system of claim 16, wherein the control module is configured to modify the designated operating parameter of only the one or more donating cylinders responsive to the monitored operating parameter differing from the designated operating parameter.

18. The system of claim 16, wherein the control module is configured to one or more of designate or modify the designated operating parameter during movement of a vehicle that includes the one or more donating cylinders and the one or more non-donating cylinders.

19. The system of claim 16, wherein the designated operating parameter includes one or more of:
an exhaust valve closure parameter that defines when an exhaust valve of the one or more donating cylinders and the one or more non-donating cylinders is opened or closed, or
a start of injection parameter that defines when fuel is injected into the one or more donating cylinders and the one or more non-donating cylinders.

20. The system of claim 16, further comprising:
a first fuel limiting device configured to be fluidly coupled with the one or more donating cylinders; and
a separate, second fuel limiting device configured to be fluidly coupled with the one or more non-donating cylinders,
wherein the first fuel limiting device and the second fuel limiting device separately control supply of fuel to the respective one or more donating cylinders and the one or more non-donating cylinders such that a smaller amount of fuel is supplied to the one or more donating cylinders than the one or more non-donating cylinders or the smaller amount of fuel is supplied to the one or more non-donating cylinders than the one or more donating cylinders.

* * * * *